(12) United States Patent
Murray et al.

(10) Patent No.: US 6,202,433 B1
(45) Date of Patent: Mar. 20, 2001

(54) PROTECTION SYSTEM FOR REFRIGERANT IDENTIFICATION DETECTOR

(75) Inventors: Walter D. Murray, Pioneer; William C. Brown, Bryan, both of OH (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/412,126

(22) Filed: Oct. 5, 1999

Related U.S. Application Data

(63) Continuation-in-part of application No. 09/273,212, filed on Mar. 19, 1999, now Pat. No. 6,138,462.

(51) Int. Cl.$^7$ ........................................................... F25B 45/00
(52) U.S. Cl. ............................................. 62/292; 62/149
(58) Field of Search ................................. 62/149, 292, 475, 62/77

(56) References Cited

U.S. PATENT DOCUMENTS

| Re. 33,212 | 5/1990 | Lower et al. ............................ 62/126 |
| --- | --- | --- |
| 4,261,178 | 4/1981 | Cain . |
| 4,363,222 | 12/1982 | Cain . |
| 4,364,236 | 12/1982 | Lower et al. . |
| 4,441,330 | 4/1984 | Lower et al. . |
| 5,127,239 | 7/1992 | Manz et al. . |
| 5,172,562 | 12/1992 | Manz et al. . |
| 5,181,391 | 1/1993 | Manz . |
| 5,182,918 | 2/1993 | Manz et al. . |
| 5,193,351 | 3/1993 | Laukhuf et al. . |
| 5,209,077 | 5/1993 | Manz et al. . |
| 5,231,842 | 8/1993 | Manz et al. . |
| 5,272,882 | 12/1993 | Degier et al. ............................ 62/77 |
| 5,335,512 | 8/1994 | Hancock et al. ........................ 62/292 |
| 5,517,825 | 5/1996 | Manz et al. ............................ 62/158 |
| 5,582,023 | 12/1996 | O'Neil .................................... 62/195 |
| 5,758,506 | 6/1998 | Hancock et al. ........................ 62/77 |
| 6,016,661 | 1/2000 | Sager ...................................... 62/149 |
| 6,029,472 | 9/2000 | Galbreath, Sr. ........................ 62/475 |
| 6,119,475 | 9/2000 | Murray et al. ......................... 62/292 |

Primary Examiner—William Doerrler
Assistant Examiner—Melvin Jones
(74) Attorney, Agent, or Firm—Pepper Hamilton LLP

(57) ABSTRACT

A flow control system allows sampling of refrigerant from a refrigerant recovery inlet of the system or, alternatively, the refrigerant recovery tank. Refrigerant selected from either source is metered and oil is filtered therefrom to provide a clean vapor refrigerant sample to a refrigerant identification detector. Oil separated from the refrigerant is returned to the oil drain of the main system for collection. In a preferred embodiment, a first conduit having a pressure control valve is coupled from a refrigerant inlet to the refrigerant recovery and recharging system. A check valve, a metering orifice, and an oil separator is coupled in the first conduit and to a refrigerant identification detector. The system includes a second conduit coupled to the main refrigerant recovery tank through a solenoid valve also communicating with the orifice and oil separator, with the valves being selectively operable for sampling either incoming refrigerant to the recovery and recharging system from the refrigerant circuit under service or from the recovery tank of the servicing instrument itself. A third conduit couples the collected oil from the oil separator through a check valve and control solenoid to the oil recovery system of the recovery and recharging unit.

20 Claims, 3 Drawing Sheets

PROTECTION SYSTEM FOR REFRIGERANT IDENTIFICATION DETECTOR

CROSS REFERENCE TO RELATED APPLICATIONS

This application is a continuation-in-part of U.S. patent application Ser. No. 09/273,212, entitled REFRIGERANT RECOVERY AND RECHARGING SYSTEM WITH AUTOMATIC OIL DRAIN, filed on Mar. 19, 1999, now U.S. Pat. No. 6,138,462.

BACKGROUND OF THE INVENTION

The present invention relates to an apparatus for servicing refrigeration systems and particularly to a system which integrally includes a flow control for the sampling of refrigerant type.

When vehicles are brought to a service center for professional servicing of the air conditioning system, frequently the system has had refrigerant leaks and losses in the past and either the vehicle owner or service center that does not have the proper equipment or refrigerant has mixed different types of refrigerant or added the wrong refrigerant to the system. The preferred refrigerant now in use is the environmentally approved R-134. Still available, however, is the previously used R-12 refrigerant and R-22 refrigerant is used in home air conditioning systems. Frequently, a vehicle owner will mix the wrong types of refrigerant or purchase a blend of refrigerants from a retail store in an attempt to recharge the system, which, having needed to be recharged, leaks refrigerant and does not operate satisfactorily with the wrong or blended refrigerant. Thus, when a vehicle finally reaches a service center with proper equipment for professional maintenance of the air conditioning system, frequently refrigerant contained in the system is a mix and of an unknown nature. Thus, it is necessary and desirable to identify whether this problem exists and, if so, completely new refrigerant of the proper type is employed for charging the system.

In order to detect the refrigerant in a vehicle refrigerant circuit, a sample is taken directly from the vehicle coupled to the servicing instrument. Also, it is useful to periodically monitor the recovery tank of the system to make certain it has not become contaminated. In the past, a stand-alone flow control system has been provided which provides a metered orifice and pressure control switch to allow the sampling of refrigerant from the servicing unit to a refrigerant identification instrument, such as a Neutronics ACR2KID, through an oil separator. The oil separator protects the instrument from damage due to oil in the refrigerant being sampled from entering the instrument. The disadvantages of this prior art system is that it is an add-on, stand-alone unit requiring its own power source and is somewhat prone to incorrect installation by the service technician to protect the refrigerant identification unit. Further, this only permits testing of refrigerant on the low side (vapor) of the air conditioning servicing unit.

There remains a need, therefore, for a protection system for refrigerant identification detectors and one which is integrated with the refrigerant recovery and recharging system and one which allows sampling of refrigerant, either from the high or low pressure sides of the recovery system and also from the main refrigerant tank.

SUMMARY OF THE PRESENT INVENTION

The system and method of the present invention provides a refrigerant recovery system which evacuates and recovers refrigerant from a refrigeration circuit, such as a vehicle air conditioning system, filters and removes oil therefrom, and recharges the refrigerant to the proper pressure, adding new oil as required. Integrally included within the recovery and recharging system is a flow control system allowing for the sampling of refrigerant from a refrigerant recovery inlet of the system or, alternatively, the refrigerant recovery main tank as well as metering refrigerant selected from either source, filtering oil therefrom to provide a clean vapor refrigerant sample to the refrigerant identification detector. Oil separated from the refrigerant is returned to the oil drain of the main system for collection.

In a preferred embodiment of the invention, an orifice of about 0.016" to 0.025" is provided to limit the flow rate. A pressure operated sensor allows sensing of refrigerant only when the pressure is below a predetermined level, thereby protecting the oil separator and refrigerant identification detector from excessive pressures and oil blow by. Systems embodying the present invention include a first conduit having a pressure control valve coupled thereto and a check valve permitting refrigerant coupled from the refrigerant inlet to the refrigerant recovery and recharging system to a check valve, a metering orifice, an oil separator, and having an outlet for coupling to a refrigerant identification detector. The system includes a second conduit coupled to the main refrigerant recovery tank through a solenoid valve communicating also with the orifice and oil separator, with a valve being selectively operable for sampling either incoming refrigerant to the recovery and recharging system from the refrigerant circuit under service or from the recovery tank of the servicing instrument itself. A third conduit couples the collected oil from the oil separator through a check valve and control solenoid to the oil recovery system of the recovery and recharging unit.

Thus, with the system of the present invention, refrigerant can be safely sampled by either the circuit under servicing or the recovery tank of the servicing unit, protecting the refrigerant identification detector from damage due to oil blow by or excessive flow rates of refrigerant. These and other features, objects and advantages of the present invention will become apparent upon reading the following description thereof together with reference to the accompanying drawings.

DETAILED DESCRIPTION OF THE PREFERRED EMBODIMENT

Figure 1:
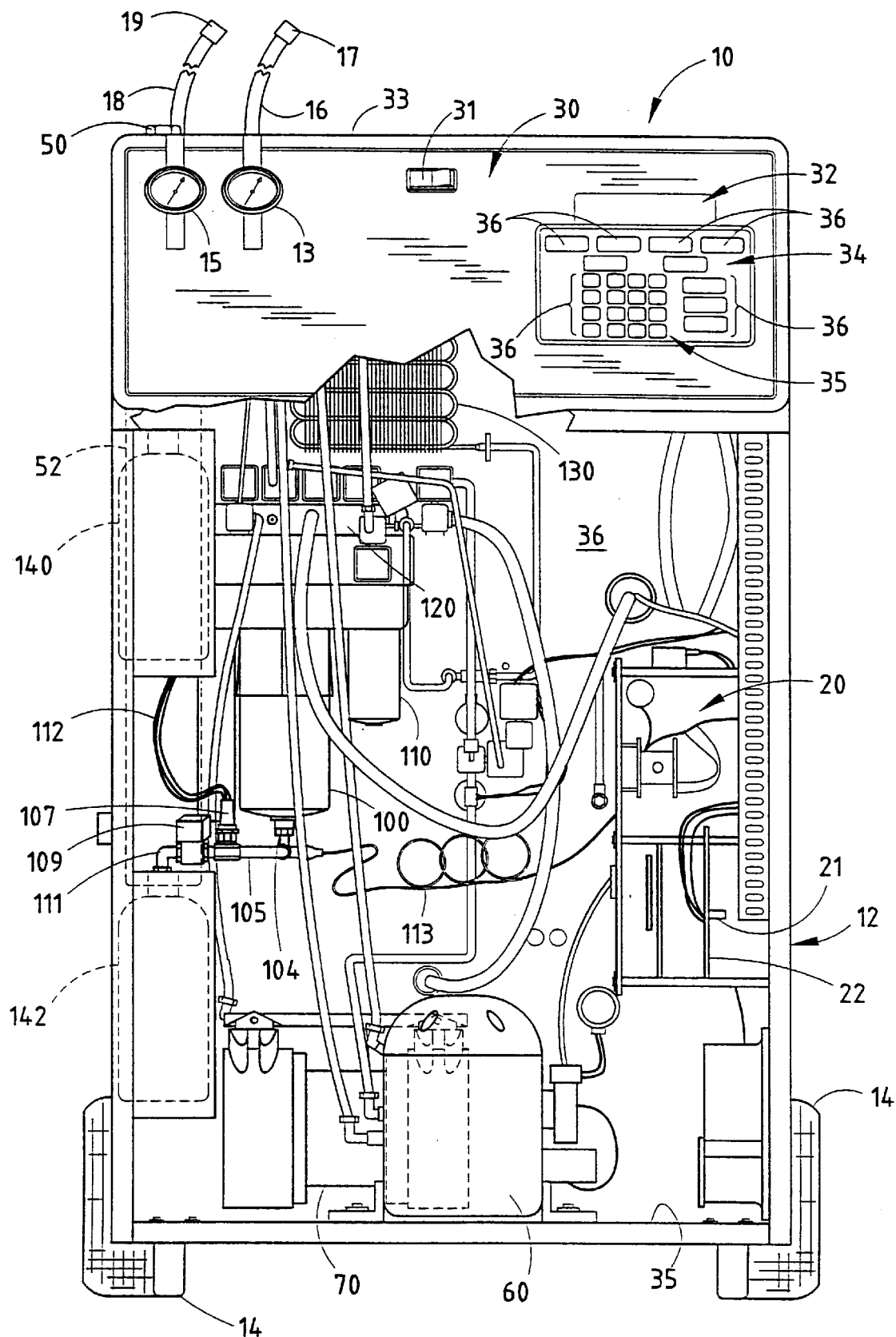
FIG. 1 is a front elevational view, partly broken away, of a refrigerant maintenance system for a vehicle which incorporates the present invention.

Referring initially to FIG. 1, there is shown a maintenance unit 10 for coupling to a refrigerant circuit such as a vehicle's air conditioning system for its maintenance. The unit 10 comprises a portable machine mounted within a cabinet 12 supported by a pair of wheels 14, such that it can be conveniently moved to the situs of a vehicle. Unit 10 includes a high pressure hose 16, typically color coded red, with a coupling 17 for coupling to the vehicle's high pressure port and a low pressure hose 18, typically color coded blue, having a coupling 19 for coupling to the low pressure port of the vehicle's refrigerant circuit. The front panel of the cabinet is shown broken away in FIG. 1 to show the major elements of the system which are also identified by similar numbers in the flow diagram of FIG. 2.

Figure 2:
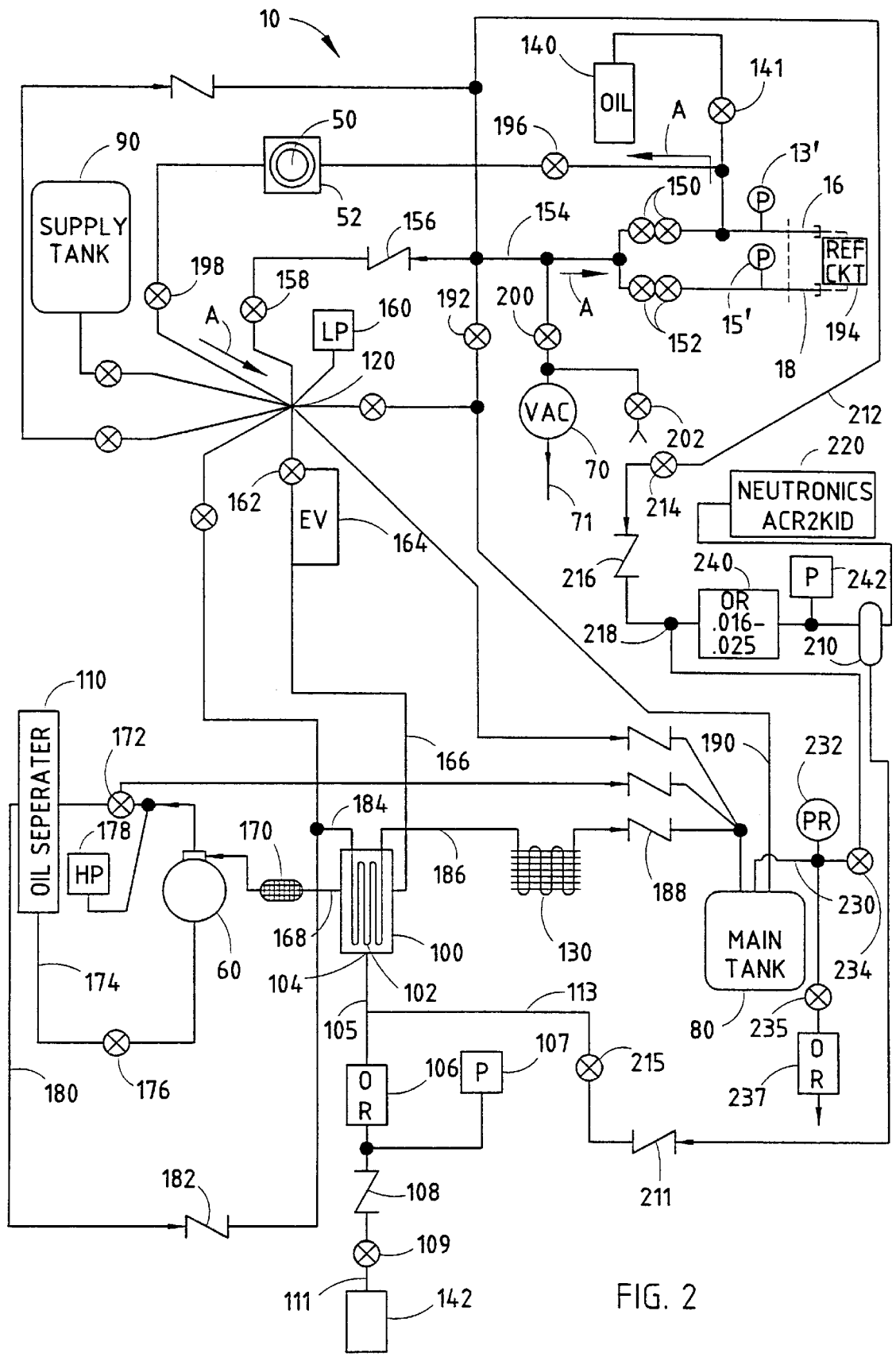
FIG. 2 is a flow diagram of the refrigerant recovery, flushing, evacuation, and recharging system incorporated in the system shown in FIG. 1.

The maintenance unit 10 includes an electronic module 20 integrally including a microprocessor 21 on a circuit board 22 for controlling the electromechanical solenoid valves shown in the flow diagram of FIG. 2 and for receiving input information from the pressure sensors and control switches included on the control panel 30 shown in FIG. 1. The control panel 30 includes an on/off switch 31 and a display 32 for displaying the operational status of the machine operation, which display may be an LCD display or other suitable electronic display coupled to the microprocessor via a conventional input/output circuit. The display panel 30 further includes a switch panel 34 having a conventional keyboard 35 and a plurality of push-button switches 36 for controlling the operation of the machine through its various phases of operation and/or for selecting parameters for display. Thus, the keyboard 35 in conjunction with the operational switches 36 and display 32 allow the operator to enter the desired operational parameters for the machine according to manufacturer specifications for the servicing of an air conditioner unit in a particular vehicle.

The input hoses 16 and 18 are coupled to mechanical pressure gauges 13 and 15, respectively, which are mounted on the front panel of the service unit 10, as seen in FIG. 1. In addition, electrical pressure transducers 13' and 15' are coupled to the hoses 16 and 18, as shown in FIG. 2, and are coupled to the microprocessor through conventional input/output circuits to provide the microprocessor with information as to the current pressure in the hoses during operation of the unit. Gauges 13 and 15 additionally provide the operator with a conventional analog display of the pressure. Mounted to the top surface 33 of cabinet 12 is a sight gauge 50 which also includes an integral replaceable filter cartridge 52 mounted to the cabinet for filtering particulate material from the refrigerant during the flushing cycle as described in greater detail below.

Mounted to the floor 35 of cabinet 12 is a compressor 60 and a vacuum pump 70. A main tank 80 and a supply tank 90 (FIG. 2) of refrigerant for the supply of refrigerant to the system are mounted behind the front of cabinet 12 on an extension of floor 35. The supply tank 90 supplies make-up refrigerant to the main tank 80 as described in connection with U.S. patent application entitled BACKGROUND TANK FILL, filed Mar. 19, 1999, Ser. No. 09/272,789, the disclosure of which is incorporated herein by reference. Mounted to the rear wall 36 of cabinet 12 is an oil accumulator tank 100, a compressor oil separator filter 110, a manifold 120 (shown as a node in FIG. 2), and a condenser 130. In addition, a fresh oil canister 140 is mounted within a side compartment of cabinet 12. A recovery oil container 142 is mounted on the lower part of the cabinet to receive oil drained from the accumulator 100 and from drain 113 coupled to oil separator 210 as described below. Having briefly described the major components of the refrigerant servicing unit 10 shown in FIGS. 1 and 2, a more detailed description of the system follows in connection with the FIG. 2 diagram.

Initially, the hoses 16 and 18 are coupled to the vehicle and the refrigerant is sampled as described in detail below. After the refrigerant is sampled, the recovery cycle is initiated by the opening of the dual back-to-back high pressure and low pressure solenoids 150, 152, respectively. This allows the refrigerant within the vehicle to flow through conduits 154 through check valve 156 and recovery valve 158 into the manifold 120. A low pressure switch 160 senses the pressure and provides an output signal coupled to the microprocessor through a suitable interface circuit which is programmed to detect when the pressure has recovered refrigerant down to 13" of mercury. The refrigerant then flows through valve 162 and unit 164 via conduit 166 into the accumulator 100 where it travels through an output conduit 168 through a water separating molecular sieve 170 to the input of compressor 60. Compressor 60 draws the refrigerant through the compressor through a valve 172 and through the oil separating filter 110 for the compressor which circulates oil back to the compressor through conduit 174 and oil return valve 176. A pressure transducer 178 is coupled to the microprocessor which is programmed to determine the upper pressure limit of, for example, 435 psi to shut down the compressor in the event the pressure becomes excessive. The compressed refrigerant exits the oil separator through conduit 180, through check valve 182 and through a heating coil 102 in accumulator 100 via conduit 184. The heated compressed refrigerant flowing through coil 102 assists in maintaining the temperature in accumulator 100 within a working range. The refrigerant then flows through conduit 186 to the condenser 130 which cools the compressed refrigerant which next flows through check valve 188 and into the main tank 80.

During the recovery and flushing processes, oil is separated from the recovered refrigerant into the accumulator/oil separator 100, which comprises a generally cylindrical tank as seen in FIG. 1, having a drain 104 at the bottom thereof (FIGS. 1 and 2) which communicates with a conduit 105 coupled to an orifice 106 for restricting oil flow. Orifice 105 is an inline fitting which is hidden in FIG. 1 but which is shown in FIG. 2 in block form. Orifice 106 has a diameter of from about 0.035" to about 0.050" and preferably about 0.042" selected to limit the flow rate of oil from accumulator 100 to tank 142 preventing, in connection with the control of valve 109, the loss of refrigerant. A pressure sensing switch 107 is coupled to the junction of orifice 106 and a check valve 108. An electrically actuated solenoid 109 is coupled to collection bottle 142 through conduit 111. Suitable conductors 112 (FIG. 1) couple the pressure sensing switch 107 and electrically actuated solenoid 109 to the microprocessor carried on circuit board 22 by means of conventional interface circuits. The oil drain 104 is also coupled by conduit 113 to an oil separator 210 coupled to a refrigerant identifier instrument 220, such as a Neutronics ACR2KID which, with the present invention, can be integrated into the maintenance unit 10. The protection system for the sampling of refrigerant from either the high or low pressure sides 16 or 18 of the vehicle refrigerant circuit or from the main recovery tank 80 is also shown in FIG. 2.

The protection system of the present invention includes a first conduit 212 (FIG. 2) coupled to a common port 213 at the input side of the system coupled by hoses 16 and 18 to service unit 10 for sampling refrigerant from a vehicle's air conditioner. Conduit 212 is coupled to a normally closed inlet test solenoid valve 214, in turn, serially coupled to a check valve 216 and to node 218. A second conduit 230 is coupled to the main tank 80, a pressure regulator 232 to maintain the pressure at about 30 p.s.i. and to a tank test solenoid valve 234. A metering orifice 240 couples node 218 to oil separator 210. Metering orifice 240 has a diameter of from about 0.016" to 0.025" and limits the flow of refrigerant sampled either from the tank via conduit 230 or from the vehicle system via conduit 212. A pressure detecting switch 242 is positioned upstream of orifice 240 and selectively controls sampling valves 214 and 234 between a pressure range of 27 p.s.i. (opening pressure) and 40 p.s.i. (closing pressure) to prevent excessive vapor pressure during sampling by instrument 220. Oil separator 210 is coupled to the output of orifice 240 and drains through conduit 113 and check valve 211 and a normally open oil drain 215 to container 142 as described above. Valve 215 is normally open, except during sampling, to allow the oil separator 210 to drain and clear, preventing over filling of the separator. The check valve prevents oil and/or refrigerant from being forced from the accumulator 100 into the oil separator 210.

Separator 210 is a latex saturated Grade 5 coalescing element part number 701551, available from the Finite Filter Division of Parker Filtration, and filters undesired oil from the flow path from either of conduits 212 or 230 being sampled by instrument 220. The operation of the refrigeration protection circuit during its sampling is controlled by the microprocessor 21 which also controls the operation of the servicing unit 10 as described in U.S. patent application Ser. No. 09/273,212, entitled REFRIGERANT RECOVERY AND RECHARGING SYSTEM WITH AUTOMATIC OIL DRAIN, filed on Mar. 19, 1999, the disclosure of which is incorporated herein by reference, as well as the BACKGROUND TANK FILL application identified above. The refrigerant sampling subroutine for the microprocessor 21 is now described in connection with FIG. 3.

Figure 3:
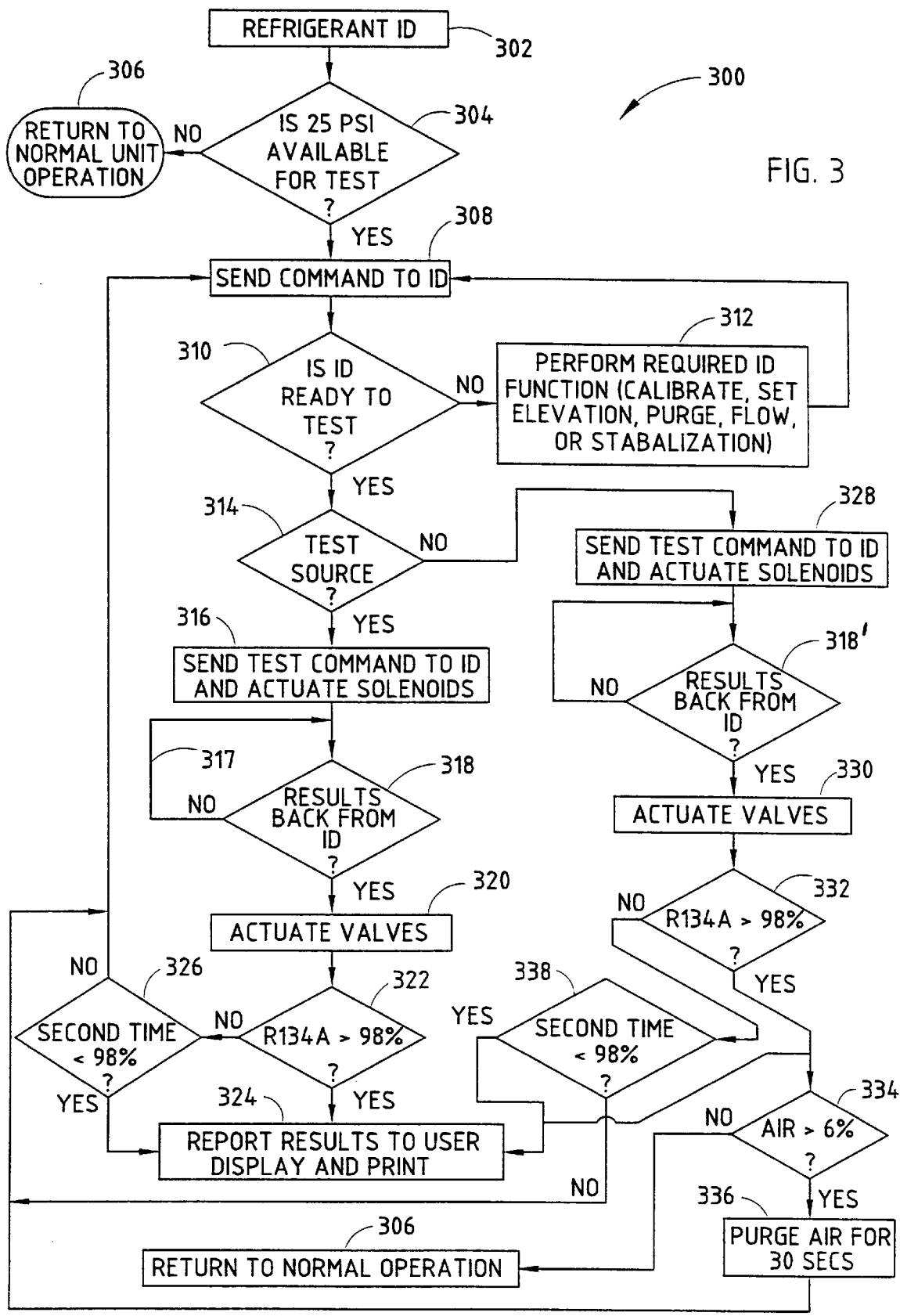
FIG. 3 is a flow diagram of the program for the microprocessor employed to control the protection system of the present invention.

The flow chart of FIG. 3 shows the subroutine 300 for controlling the flow of refrigerant to be sampled by instrument 220 from either the vehicle's high or low pressure side coupled by hoses 16 and 18 through conduit 212 or from the recovery tank 80 through conduit 230. The subroutine is begun by a command from an RS232 port coupled by microprocessor 21 to the instrument 220 initializing the refrigerant identification sequence. The first test is to determine whether 25 pounds of refrigerant is available, as indicated by block 304, which is accomplished by monitoring pressure gauges 13' and 15' inasmuch as that is the level necessary for providing a sample to the analyzer 220. If 25 p.s.i. is unavailable, the subroutine returns to the normal recovery routine 306 for the recovery and recharging system. If 25 pounds of refrigerant power is available, a command is sent by the microprocessor to the instrument 220 to start the identification sequence, as indicated by block 308. Neutronic system includes a self-test which is monitored by the microprocessor as indicated in block 310 to determine whether it is calibrated and ready to test the refrigerant. If not, as indicated by block 312, calibration, elevation, purge, flow, or stabilization routines within the instrument 220 are performed, as indicated by block 312, and the subroutine cycled through a loop including block 308 and 310 until such time as the Neutronic's instrument is ready to analyze refrigerant.

Next, the subroutine checks to determine whether the sample is from the vehicle or the recovery tank 80 as indicated by block 314. This can be set by the operator and typically the vehicle will be under test, and the subroutine moves to block 316 where valves 152 are initially opened on the low pressure side to determine whether to provide refrigerant for sampling. If the low side has less than 25 p.s.i., valves 150 are opened to determine whether sufficient pressure exists on the high side. At the same time the program at block 316 closes, oil recovery valve 215 opens sampling solenoid valve 214 to allow a sample to be introduced through orifice 240 to oil separator 210 into analyzer 220. The Neutronic system then samples the refrigerant as indicated by block 318 and, after approximately 10 seconds, determines whether a sufficient amount of refrigerant has been introduced to provide an analysis. If not, the valves remain open as indicated by loop 317 of the subroutine 300 until a sufficient sample has been introduced to the instrument. When this occurs, as indicated by block 320, the solenoid valves 150 or 152 are closed, as is valve 214, and the oil drain valve 215 again opened. The analyzer 220 then provides information to the microprocessor as to whether or not greater than 98% of refrigerant is R134A, as indicated by block 322, and, if it is, the analyzer 220 provides a signal to microprocessor 21, as indicated by block 324, to provide a display of the information on the display panel 32 (FIG. 1) of the instrument displaying the results of the analysis. If, however, the test indicates that the refrigerant is at less than 98% of R134A, it loops through the sequence including blocks 308 through 322 again, and, if less than 98% a second time, the test results are reported to the user and completed.

If in block 314 the test source is the internal recovery tank 80, the subroutine moves to block 328 to open valve 234 associated with the tank 80, closing at the same time the oil recovery valve 215. The instrument tests the sample, as indicated at block 318', for ten seconds to determine if a sufficient sample has been taken. If so, the valve 234 is closed and valve 215 opened, as indicated by block 330. Again, the analyzer 220 tests to determine whether at least 98% of the refrigerant detected is R134A, as indicated by block 332. The results of the test at block 332 are reported to the user, as indicated by block 324, and, at the same time, the sample is tested for air, as indicated by block 334, to determine whether or not there is more than 6% of air in the sample. If the sample includes more than 6% of air, an air purge solenoid 235 (FIG. 2) is opened, as indicated by subroutine block 336, to purge air from the main tank 80 through an outlet orifice 237 to the atmosphere for approximately thirty seconds. The program then returns through the loop including blocks 308, 310, 314, 328 through 334 and, assuming the air is less than 6%, the program returns to block 306 for normal operation of the servicing unit. If at block 332 the R134A is less than 98%, as indicated by block 338, the subroutine cycles through a second test, as indicated by block 338, and, if on the second pass the R134A is less than 98%, it reports the results to the user, indicating that the tank needs with fresh refrigerant from supply tank 90 as described in the above-identified copending application entitled BACKGROUND TANK FILL.

Thus, with the system of the present invention, an integrated refrigerant identification system for identifing the refrigerant in either the vehicle under service or in the recovery tank can be automatically achieved without the need for the attachment of separate equipment which must be separately controlled.

It will become apparent to those skilled in the art that various modifications to the preferred embodiment of the invention as described herein can be made without departing from the spirit or scope of the invention as defined by the appended claims.

The invention claimed is:

1. A protection system for a refrigerant identification detector comprising:

a first conduit coupled to a refrigeration circuit under test, said first conduit including a metering orifice and a solenoid control valve;

an oil separator coupled to said first conduit;

a refrigerant identification analyzer coupled to said oil separator; and a control circuit for selectively actuating said solenoid valve to meter refrigerant to said analyzer.

2. The system as defined in claim 1 and further including a refrigerant recovery tank and a second conduit coupled to said refrigerant recovery tank of a refrigerant recovery and recharging system, said second conduit including a solenoid valve coupling said second conduit to said oil separator.

3. The system as defined in claim 2 and further including a third conduit coupled from said oil separator, said third conduit including a check valve and a solenoid control valve coupled to an oil collection tan.

4. The system as defined in claim 3 wherein said control circuit includes a microprocessor for selectively controlling said solenoid valves to select refrigerant for identification by said refrigerant identification analyzer from one of a circuit under service and said recovery tank.

5. The system as defined in claim 4 wherein said metering orifice has a diameter of from about 0.016" to about 0.025".

6. The system as defined in claim 5 and further including a fourth conduit coupled to said solenoid valve associated with said second conduit, said fourth conduit including a solenoid control valve and a metering orifice, wherein said microprocessor controls said solenoid of said fourth conduit for selectively purging air from said refrigerant recovery tank when above a predetermined level.

7. The method of identifying a refrigerant from a refrigerant circuit under test by a refrigerant recovery and recharging system comprising the steps of:
   testing the pressure of a source of refrigerant to be analyzed to determine if it exceeds a minimum pressure;
   metering refrigerant from the refrigerant circuit to be tested through an orifice and an oil separator;
   controlling the pressure of the metered refrigerant to the oil separator to limit the pressure of refrigerant supplied to the oil separator; and
   coupling a refrigerant identification analyzer to an output of the oil separator for identifying refrigerant supplied thereto.

8. The method as defined in claim 7 and further including the steps of selectively draining oil from said oil separator when refrigerant is not under analysis.

9. The method as defined in claim 7 and further including selectively sampling refrigerant from a refrigerant recovery tank through the metering orifice and oil separator.

10. The method as defined in claim 7 and further including an air purge selectively purging air from the main tank when air above a predetermined level is detected by the analyzer.

11. A protection system for use in connection with a refrigerant recovery and recharging system which includes an inlet coupled to a refrigeration circuit under test and a recovery tank for recovery tank for recovered refrigerant, said protection circuit comprising:
   a microprocessor;
   a plurality of solenoid valves coupled by conduits to said input of the refrigerant circuit under test and to said refrigerant recovery tank and selectively controlled by said microprocessor to select one of the sources of refrigerant for analysis;
   a pressure control coupled to detect the pressure of refrigerant from either of said sources and controlling the pressure between upper and lower limits;
   a metering orifice coupled between said sources of refrigerant for test;
   an oil separator coupled to said orifice; and
   a refrigerant analyzer coupled to said oil separator.

12. The protection system as defined in claim 11 and further including an oil drain and solenoid control valve coupled to said oil drain of said oil separator and to said microprocessor for selectively draining oil from said oil separator when the control solenoid for said sources of refrigerant under analysis are closed.

13. The protection system as defined in claim 12 and further including an air purge conduit coupled to said refrigerant recovery tank and including a solenoid valve coupled to said microprocessor and selectively controlled by said analyzer to purge air for a predetermined period of time when air is detected in said refrigerant recovery tank.

14. A protection system for a refrigerant identification detector comprising:
   a first conduit coupled to a refrigeration circuit under test, said first conduit including a first metering orifice and a first solenoid control valve;
   an oil separator coupled to said first conduit;
   a refrigerant identification analyzer coupled to said oil separator;
   a refrigerant recovery tank;
   a second conduit coupled to said refrigerant recovery tank of a refrigerant recovery and recharging system, said second conduit including a second solenoid valve coupling said second conduit to said oil separator; and
   a control circuit for selectively actuating said first and second solenoid valves to selectively meter refrigerant to said analyzer.

15. The protection system as defined in claim 14 and further including a pressure detector coupled to said control circuit which is responsive to signals therefrom to allow sampling of refrigerant between a predetermined range of pressures.

16. The protection system as defined in claim 15 and further including a third conduit coupled to said oil separator, said third conduit including a check valve and a third solenoid control valve coupled to an oil collection tank, said third solenoid coupled to said control circuit to drain oil from said separator into said collection tank when said first and second solenoid valves are closed.

17. The protection system as defined in claim 16 wherein said control circuit includes a microprocessor for selectively controlling said solenoid valves to select refrigerant for identification by said refrigerant identification analyzer from one of a circuit under service and said recovery tank.

18. The protection system as defined in claim 17 wherein said range of pressure is from about 25 p.s.i. to about 40 p.s.i.

19. The protection system as defined in claim 18 wherein said metering orifice has a diameter of from about 0.016" to about 0.025".

20. The protection system as defined in claim 19 and further including a fourth conduit and a fourth solenoid valve coupled to said recovery tank and to said microprocessor for purging air from said tank when present in an amount greater than about 6%.

* * * * *